United States Patent [19]

Noriyama et al.

[11] Patent Number: 5,132,819
[45] Date of Patent: Jul. 21, 1992

[54] LIQUID-CRYSTAL DISPLAY DEVICE OF ACTIVE MATRIX TYPE HAVING CONNECTING MEANS FOR REPAIRING DEFECTIVE PIXELS

[75] Inventors: Hidetaka Noriyama, Himeji; Isao Fukui, Hyogo; Tokio Kiboshi, Himeji; Shoudai Nakayama, Hyogo; Masanori Abe; Tomio Kashihara, both of Himeji, all of Japan

[73] Assignee: Kabushiki Kaisha Toshiba, Kawasaki, Japan

[21] Appl. No.: 642,666

[22] Filed: Jan. 17, 1991

[30] Foreign Application Priority Data

Jan. 17, 1990 [JP] Japan .................................... 2-8025
Feb. 21, 1990 [JP] Japan .................................... 2-40210
Jul. 23, 1990 [JP] Japan .................................. 2-193130

[51] Int. Cl.$^5$ ............................................. G02F 1/13
[52] U.S. Cl. ...................................... 359/58; 359/59; 340/784
[58] Field of Search ................ 350/333, 334; 340/784; 359/58, 59

[56] References Cited

U.S. PATENT DOCUMENTS

| | | | |
|---|---|---|---|
| 4,759,610 | 7/1988 | Yanagisawa | 350/334 |
| 4,807,973 | 2/1989 | Kawasaki | 350/334 X |
| 4,840,459 | 6/1989 | Strong | 350/333 |
| 4,938,566 | 7/1990 | Takeda et al. | 350/333 X |

Primary Examiner—Stanley D. Miller
Assistant Examiner—Huy K. Mai
Attorney, Agent, or Firm—Cushman, Darby & Cushman

[57] ABSTRACT

In a liquid-crystal display device of active matrix type, a plurality of column-selecting lines and a plurality of auxiliary capacitance lines are formed on a transparent substrate. A plurality of row-selecting lines and two display-electrode segments are formed on an insulative film formed on the column-selecting and auxiliary capacitance lines and the transparent substrate. Two switching elements each connected to the column-selecting, row-selecting and auxiliary capacitance lines are also formed on the transparent substrate. Two auxiliary capacitors are formed between the display-electrode segments and the auxiliary capacitance line. A strip conductor is formed on the transparent substrate under each pair of display-electrode segments. A common electrode opposes the display-electrode segments with a liquid crystal layer therebetween.

21 Claims, 9 Drawing Sheets

LIQUID-CRYSTAL DISPLAY DEVICE OF ACTIVE MATRIX TYPE HAVING CONNECTING MEANS FOR REPAIRING DEFECTIVE PIXELS

Background of the Invention

1. Field of the Invention

The present invention relates to a liquid-crystal display device of active matrix type having an array of pixels and an array of thin film transistors which function as switching elements for driving the pixels.

2. Description of the Related Art

Recently, flat display devices have been developed. Due to the use of flat displays, various apparatuses have been made thin. There is now a great demand for liquid-crystal display devices of active matrix type which can display color images and have high pixe density. The recent trend in the art is to use more and more color liquid-crystal display devices in projectors and OA (Office Automation) apparatuses. Hence, it is demanded that liquid-crystal display devices of active matrix type be provided which have various sizes, large and small, and high pixel densities.

A liquid-crystal display device of active matrix type comprises an array of pixels and an array of thin-film transistors (hereinafter referred to as "TFT"), each provided for one pixel. The TFTs function as switching elements. When turned on, they supply video signals to the pixels, thereby driving the pixels in a quasi-static manner. The pixels respond to the video signals at high speed, and no crosstalk involves in supplying the video signals to the pixels. Therefore, the display device of active matrix type can display highresolution, high-contrast images.

Figure 1:
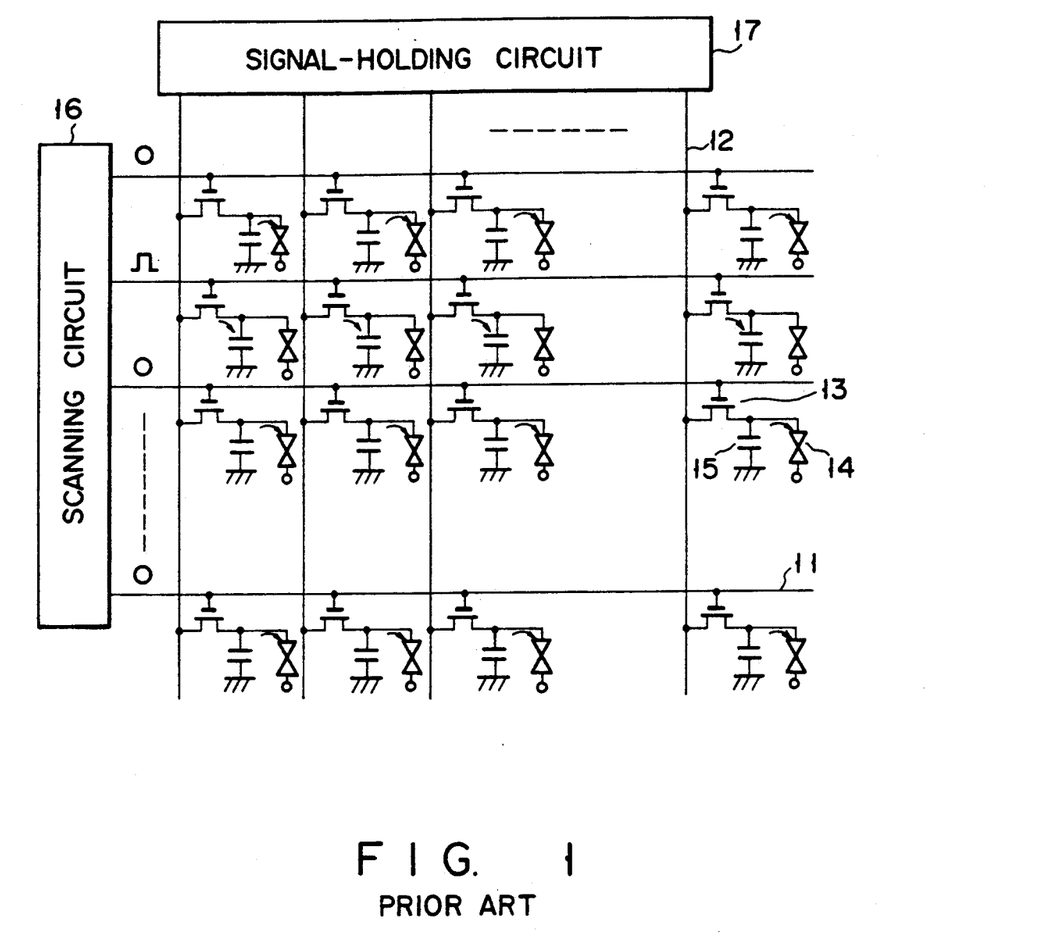
FIG. 1 is a block diagram showing a conventional liquid-crystal display device of active matrix type.

With reference to FIG. 1, it will be explained how the liquid-crystal display device of active matrix type perform its function. As is shown in FIG. 1, the device comprises a plurality of parallel scanning lines 11 (i.e., column-selecting lines), a plurality of parallel signal lines 12 (i.e., row-selecting lines) intersecting with the scanning lines 11, a plurality of TFTs 13 (i.e., switching elements) located at the intersections of the lines 11 and 12, a plurality of liquid-crystal layers 14 located at the intersections of the lines 11 and 12, a plurality of pixel capacitors 15 located at the intersections of the lines 11 and 12, a scanning circuit 16 connected to the scanning lines 11, and a signal-holding circuit 17 connected to the signal lines 12. The gate of each TFT 13 is connected to a scanning line 11, whereby the liquid-crystal layer 14 and the pixel capacitor 15 located near the TFT 13 are electrically connected to the signal line 11. The scanning circuit 16 sequentially supplies gate pulses to the scanning lines 11. The signal-holding circuit 17 supplies one-line video signals to the signal lines 12 in synchronism with the gate pulses. Each TFT 13 remains on while a gate pulse is being supplied to the scanning line 11 to which its gate is connected. The pixel capacitor 15 coupled to the TFT 13 accumulates the electrical charge which corresponds to the video signal supplied through the signal line 12 to which the TFT 13 is connected. Hence, the liquid-crystal layer 14 connected to the capacitor 15 is driven. The TFT 13 is turned off the moment a gate pulse is supplied to the next scanning line 11. The pixel capacitor 15 holds the electrical charge until a gate pulse is supplied to the scanning line 11 to which the gate of the TFT 13 is connected. As a result of this, the liquid-crystal layer 14 is continuously driven.

Figure 2:
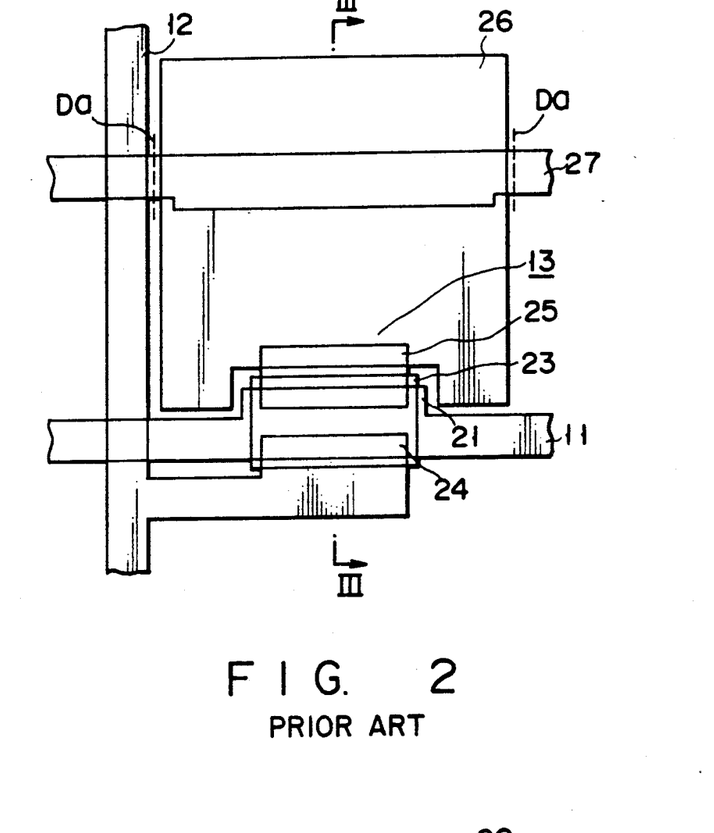
FIG. 2 is a plan view illustrating one of the pixels of the conventional liquid-crystal display device.
Figure 3:
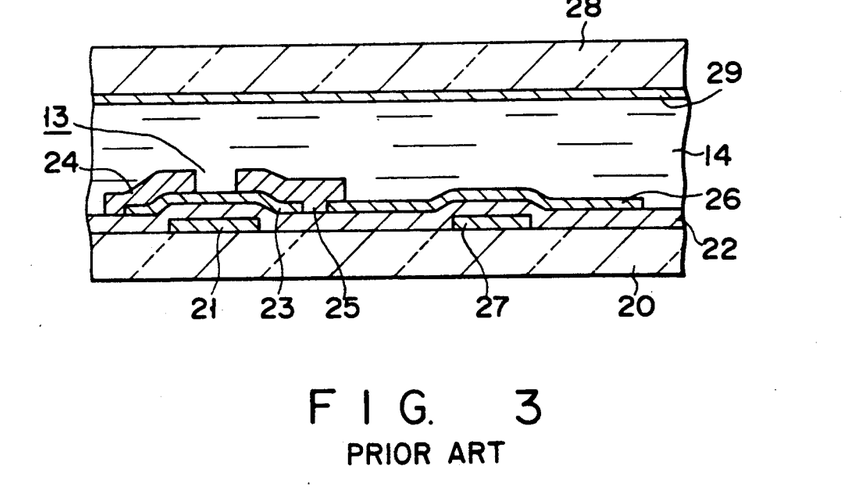
FIG. 3 is a sectional view, taken along line III—III in FIG. 2.

FIGS. 2 and 3 illustrate one of the pixels of the liquid-crystal display device of the active matrix type, which has been described above. More precisely, FIG. 2 is a plan view showing the pixel-array substrate, and, FIG. 3 is a sectional view taken along line III-III in FIG. 2. A TFT 13 is formed on a lower glass substrate 20. It comprises a gate electrode 21, a gate insulating film 22, a semiconductor layer 23, a drain electrode 24, and a source electrode 25—all formed on the lower glass substrate 20. The gate electrode 21 and the drain electrode 24 are integral with a scanning line 11 and a signal line 12, respectively. The TFT 13 further comprises a display electrode 26 and an auxiliary capacitor line 27. The display electrode 26 is connected to the source electrode 25 The auxiliary capacitor line 27 is formed between the lower substrate 20 and the gate-insulating film 22 and located below the display electrode 26. Hence, an auxiliary capacitor is formed between the line 27 and that part of the electrode 26 which is located right above the line 27. The auxiliary capacitor, thus formed, increases the capacitance of the pixel capacitor 15, compensates for the leakage current flowing through the TFT 13 while the capacitor 15 holds the video signal, and moderates the changes in the potential of the display electrode 26 which occur due to the capacitive coupling between the electrode 26 and the other electrodes.

The pixel further comprises a common eectrode 29 formed on that surface of an upper glass substrate 28 which opposes the lower glass substrate 20. A liquid-crystal layer 14 is interposed between the lower and upper glass substrates 20 and 28. An electric field is generated between the display electrode 26 and the common electrode 29, to drive that portion of the liquid-crystal layer 14 which contacts the display electrode 26.

The pixels of the liquid-crystal display device of active matrix type are formed by forming layers and films and by performing photolithography for microprocessing these layers and films. It is difficult to manufacture a large-screen device having no defects. Since the device has a complex electrode arrangement and a multi-layered structure, short-circuiting is likely to occur between the electrodes. In most cases, short-circuiting takes place between the gate electrode 21 and the source electrode 24 which are spaced apart by the gate-insulating film 22, and between the display electrode 26 and the auxiliary capacitor line 27 which are spaced apart by the film 22. When this short-circuiting occurs, the potential of the display electrode 26 can no longer have a predetermined value. In this case, the pixel fails to operate well, inevitably degrading the quality of the image being displayed on the screen of the liquid-crystal display device. In particular, when the pixel forms a bright spot on the screen, it lowers the quality of the image. The short-circuiting between the electrodes is one of the causes which decrease the yield of the liquid-crystal display device of active matrix type.

If such a defective spot is found in the image displayed, the pixel forming this defective spot must be repaired. In other words, the short-circuited portion of the pixel must be removed. Various methods of removing the short-circuited portion have been proposed. Among these is the method in which a laser is employed. If the display electrode 26 and the auxiliary capacitor line 27, for example, are short-circuited to each other, a laser beam is applied to those parts Da of the line 27, thus cutting off these parts Da as is illustrated in FIG. 2.

This method of removing the short-circuited portion of a pixel results in the elimination of the auxiliary capacitance, that is, a decrease in the capacitance of the pixel capacitor 15. Consequently, the liquid-crystal pixel may fail to operate well, due to the leakage current of the TFT 13 or the capacitive coupling between the display electrode 26 and any other electrode. More specifically, the potential of the electrode 26 inevitably deviates from the predetermined value, and the defective spot cannot be rendered completely imperceptible. Further, the technique of removing the short-circuited portion of the pixel cannot be applied to the case where an electrical charge is applied to the auxiliary capacitance line 27 from only end thereof, or the case where the gate and source electrodes 21 and 25 are short-circuited to each other.

SUMMARY OF THE INVENTION

One object of the present invention is to provide a liquid-crystal display device of active matrix type with which it is possible to repair defective pixels, if any resulting from short-circuiting between electrodes, almost completely by means of a laser.

Another object of the invention is to provide a liquid-crystal display device of active matrix type with which it is possible to repair defective pixels, if any resulting from short-circuiting between electrodes, almost completely by means of a laser, and which have virtually no defective pixels, can therefore display high-quality images, and can have a screen, either large and small, having a high pixel density.

According to a first aspect of the present invention, there is provided a liquid-crystal display device of active matrix type which comprises:

a transparent substrate;

a plurality of column-selecting lines arranged on the substrate;

a plurality of auxiliary capacitance lines arranged on the substrate and electrically isolated from the column-selecting lines;

a plurality of row-selecting lines arranged on the substrate, intersecting with the column-selecting lines, and electrically isolated from the column-selecting lines;

a plurality of display electrodes arranged in rows and columns, each defining one pixel and consisting of a first display-electrode segment and a second display-electrode segment;

a plurality of first switching elements connecting the first display-electrode segments to the column-selecting lines and the row-selecting lines, respectively;

a plurality of second switching elements connecting the second display-electrodes segments to the column-selecting lines and the row-selecting lines, respectively;

a first auxiliary capacitor interposed between the first display-electrode segments on the one hand and the auxiliary capacitance lines on the other hand;

auxiliary capacitor interposed between the a second second display-electrode segments on one hand and the auxiliary capacitance lines on the other hand;

a plurality of conductors provided for the pixels, each overlapping the corresponding first display-electrode segment and the corresponding second display-electrode segment, for electrically connecting the first and second display-electrode segments;

a common electrode opposing the first display-electrode segments and the second display-electrode segments; and a layer of liquid crystal interposed between the common electrode on the one hand and the first and second display-electrode segments on the other hand.

According to a second aspect of the invention, there is provided a liquid-crystal display device of active matrix type which comprises:

a transparent substrate;

a plurality of column-selecting lines arranged on the substrate;

a plurality of auxiliary capacitance lines arranged on the substrate and electrically isolated from the column-selecting lines;

a plurality of row-selecting lines arranged on the substrate, intersecting with the column-selecting lines, and electrically isolated from the column-selecting lines;

a plurality of display electrodes arranged in rows and columns, each defining one pixel;

a plurality of first display-electrode segments projecting from the display electrodes, respectively;

a plurality of second display-electrode segments projecting from the display electrodes, respectively;

a plurality of switching elements connecting the display electrodes to the column-selecting lines and the row-selecting lines, respectively;

a first auxiliary capacitor interposed between the first display-electrode segments on the one hand and the auxiliary capacitance lines on the other hand;

a second auxiliary capacitors interposed between the second display-electrode segments on one hand and the auxiliary capacitance lines on the other hand;

a plurality of conductors provided for the pixes, each overlapping the corresponding first display-electrode segment and the corresponding second display-electrode segment, for electrically connecting the first and second display-electrode segments;

a common electrode opposing the first display-electrode segments and the second display-electrode segments; and a layer of liquid crystal interposed between the common electrode on the one hand and the first and second display-electrode segments on the other hand.

According to a third aspect of the invention, there is provided a liquid-crystal display device of active matrix type which comprises:

a plurality of column-selecting lines arranged on the substrate;

a plurality of auxiliary capacitance lines arranged on the substrate and electrically isolated from the column-selecting lines;

a plurality of row-selecting lines arranged on the substrate, intersecting with the column-selecting lines, and electrically isolated from the column-selecting lines;

a plurality of display electrodes arranged in rows and columns, each defining one pixel;

a plurality of first display-electrode segments projecting from the display electrodes, respectively;

a plurality of second display-electrode segments electrically isolated from the display electrodes, respectively;

a plurality of switching elements connecting the display electrodes to the column-selecting lines and the row-selecting lines, respectively;

a first auxiliary capacitor interposed between the first display-electrode segments on the one hand and the auxiliary capacitance lines on the other hand;

a second auxiliary capacitors interposed between the second display-electrode segments on one hand and the auxiliary capacitance lines on the other hand;

a plurality of conductors provided for the pixels, each overlapping the corresponding display electrode and the second display-electrode segment, for electrically connecting the display electrode and the second display-electrode segment;

a common electrode opposing the first display-electrode segments and the second display-electrode segments; and a layer of liquid crystal interposed between the common electrode on the one hand and the first and second display-electrode segments on the other hand.

If a short-circuiting occurs between any two electrodes incorporated in the display devices of th invention, one of the electrode is cut by means of a laser, and a laser beam is applied to the conductor, thereby connecting the first and second display-electrode segments together, or the display electrode and the second display-electrode segment. As a result, the defective pixel is repaired.

Alternatively, if a short-circuiting occurs between any display-electrode segment and the first or second auxiliary capacitor, the display-electrode segment or both the first and second auxiliary capacitors are cut by means of a laser, and applying a laser beam to the conductor, thereby connecting the first auxiliary capacitor to the display-electrode segment. As a result, the defective pixe is repaired.

In either case, after the cutting proces and the connecting process, a part of the switching element of the defective pixel is cut from the display electrode, thus reducing the capacitance of the switching element. As a result, the display-electrode potential of the the repaired pixel changes to a similar extent to that of any normal pixel, whereby the defective pixel is repaired completely.

Since the parts of the display electrode of any pixel are electrically connected to one another, the design freedom for the pixel is great. Therefore, the switching element can be designed to have any desired characteristics and arranged at a desired position, and the display electrode can be divided into parts in various ways.

Moreover, the sum of the gate-source capacitances of two TFTs used as two switching elements for each pixel remains unchanged even if errors have been made in the mask-aligning process. Hence, the spot, which the repaired pixel forms when driven, can hardly be distinguished from the spot formed by any normal pixel, and uniform brightness distribution of the display screen can be achieved even if the device has a large display screen, while maintaining the pixel-opening ratio at a sufficiently great value.

DETAILED DESCRIPTION OF THE PREFERRED EMBODIMENTS

Figure 4:
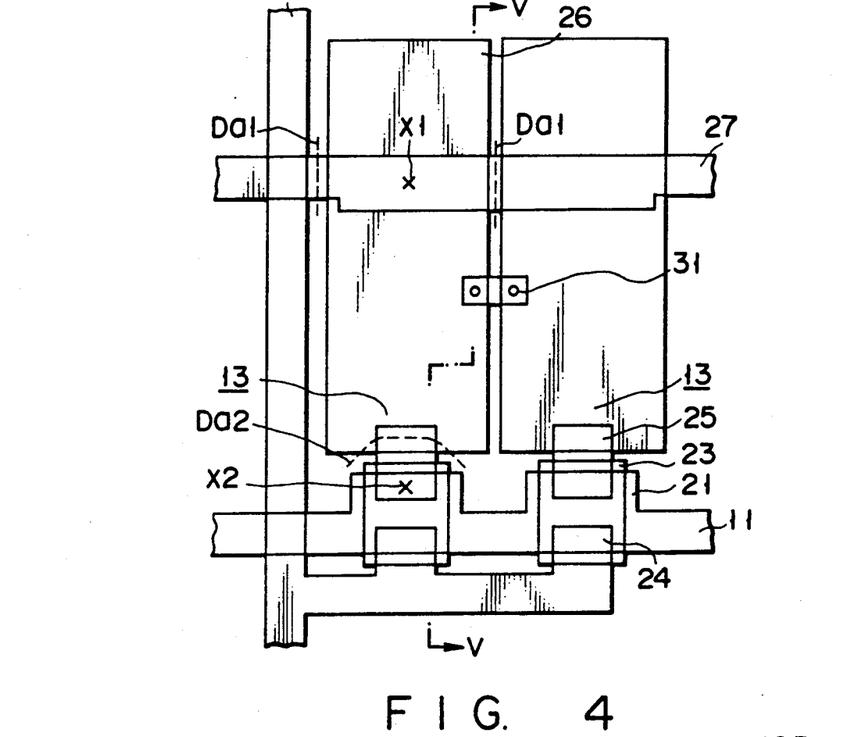
FIG. 4 is a plan view illustrating one of the pixels of a liquid-crystal display device of active matrix type, according to a first embodiment of the present invention.
Figure 5:
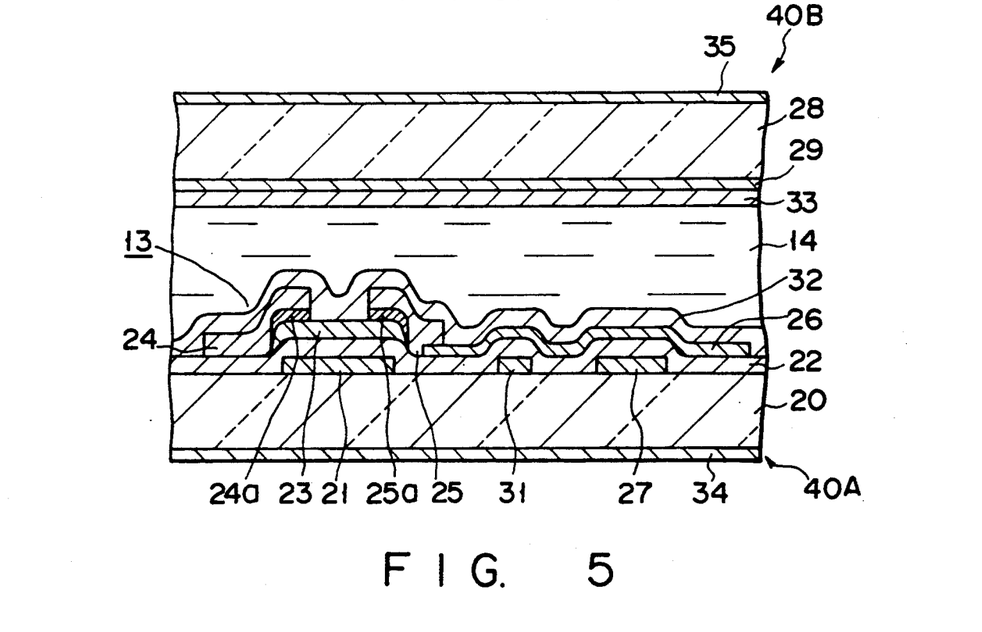
FIG. 5 is a sectional view, taken along line V—V in FIG. 4.

A liquid-crystal display device of active matrix type according to a first embodiment of the invention will now be described, with reference to FIGS. 4 and 5. In FIGS. 4 and 5, the same components as those shown in FIGS. 1, 2 and 3 are designated by the same numerals.

FIG. 4 is a plan view showing one of the pixels of the liquid-crystal display device. As can be under stood from this figure, the display device has a plurality of parallel scanning lines 11 (i.e., column-selecting lines), a plurality of parallel signal lines 12 (i.e., row-selecting lines) intersecting with the scanning lines 11, and a plurality of TFTs 13 (i.e., switching elements) located at the intersections of the lines 11 and the lines 12. Each of the TFTs 13 comprises a gate electrode 21, a semiconductor layer 23, a drain electrode 24, and a source electrode 25. The gate electrodes 21 and the drain electrode 24 are integral with the scanning line 11 and the signal line 12, respectively. The source electrode 25 is connected to a display electrode 26. An auxiliary capacitance line 27 extends substantially parallel to the scanning line 11.

Each of the pixels of the liquid-crystal display device has two TFTs 13 and two display electrodes 26. The two TFTs 13 are spaced apart from each other, in the lengthwise direction of the scanning line 11. The two display electrodes 26 are also spaced apart in the lengthwise direction of the scanning line 11, and are connected to the two TFTs 13, respectively. One conductor 31 is formed on an insulating substrate 20 and located partly below the first display electrode 26, and partly below the second display electrode 26. As is evident from FIG. 5, the conductor 31 is insulated from the two electrodes 26 by a gate-insulating film 22. The auxiliary capacitance line 27 crosses these two display electrodes 26 and extends substantially parallel to the scanning line 11.

With reference to FIG. 5 which is a sectional view taken along line V—V in FIG. 4, it will be explained how the structure shown in FIG. 4 is manufactured.

First, it will be explained how a pixel-array substrate 40A is made. At first, a chromium (Cr) film, which shields light, is formed by sputtering on the upper surface of the insulating substrate 20 which is made of glass or the like. Selected portions of the chromium film are photo-etched, thereby forming the gate electrode 21, the auxiliary capacitance line 27, and the conductor 31. At the same time, the scanning line 11 (i.e., the column-selecting line) is formed integrally with the gate electrode 21. Then, the gate-insulating film 22 made of, for example, silicon oxide (SiOx) is formed by means of plasma CVD method, on the upper surface of the resultant structure. It is this film 22 that electrically insulates the gate electrode 21 from then drain electrode 24 and the source electrode 25. The semiconductor layer 23 made of, for example, i-type amorphous silicon hydride (a-Si:H) is formed by plasma CVD method, on that portion of the gate-insulating film 22 which opposes the gate electrode 21. Further, a drain region 24a and a source region 25a, made of an n-type a-Si:H and insulated from each other, are formed on the semiconductor layer 23 by means of plasma CVD method.

Next, the display electrodes 26 are formed on that portion of the gate-insulating film 22 which is located adjacent to the source region 25a. These electrodes 26 are made by forming an ITO (Indium-Tin Oxide) film by means of sputtering, and then by photo-etching the ITO film into two layers having a desired shape. The source electrode 25 is connected at one end to the source region 25a. The other end of the electrode 25 extends over the display electrode 26 and is connected thereto.

The drain electrode 24 is connected at one end to the drain region 24a. Both the drain electrode 24 and the source electrode 25 are formed by the same method, wherein a molybdenum (Mo) film is formed, and an aluminum (Al) film is formed on the molybdenum film, and the MO-Al composite film is photo-etched. The signal line 12 (i.e., a column-selecting line) is formed in the same step as the drain electrode 24 is formed. Thus, the pixel-array substrate 40A is produced.

Then, an upper substrate 40B is produced in the following way. First, the common electrode 29 made of ITO or the like is formed on the lower surface of an upper insulating substrate 28. As is shown in FIG. 5, a molecule-orientating film 32 made of, for example low-temperature curing polyimide (PI) is formed on the upper surface of the pixel-array substrate 40A. Similarly, a molecule-orientating film 33 made of for example lowtemperature curing polyimide (PI) is formed on the common electrode 29. Both molecule-orientating films 32 and 33 are rubbed with cloth or the like, so that they can orientate liquid-crystal molecules in a specific direction. The pixel-array substrate 40A and the substrate 40B are spaced apart from each other, with their molecule-orientating axes crossing at 90° C. Liquid crystal is filled in the gap between the substrates 40A and 40B, thus forming a liquid-crystal layer 14.

A polarizing plate 34 is deposited on the lower surface of the lower insulating substrate 20, and a polarizing plate 35 is deposited on the upper surface of the upper insulating substrate 28. Illuminating light is applied from a light source (not shown) to the lower surface of the pixel-array substrate 40A or the upper surface of the substrate 40B.

Let assume that short-circuiting occurs at point X1 between the left display electrode 26 and the auxiliary capacitance line 27, as is illustrated in FIG. 4. In this case, a laser beam is applied to those parts Da1 of the auxiliary capacitance electrode 27 which are located on the sides of the left display electrode 26, thereby eliminating the short circuiting. Then, a laser beam is applied to those parts of the conductor 31 which overlap both display electrodes 26, thus forming openings in the gate-insulating film 22 and electrically connecting both electrodes 26 to the conductor 31.

As a result, the auxiliary capacitance of the pixel is reduced but to half the initial value. Hence, the leakage current of the TFT 13 is less than in the case of the conventional display device shown in FIG. 2. For the same reason, the deviation of the display-electrode potential deviates, which has resulted from the capacitive coupling between either display electrode 26 and the adjacent electrode, is less than in the conventional liquid-crystal display device. Therefore, when the pixel thus repaired is driven, it does not form a noticeable defective spot on the display screen.

Let us assume that short-circuiting occurs at point X2 between the gate electrode 21 and the source electrode 25 as is illustrated in FIG. 4. In this case, a laser beam is applied to the source electrode 25, cutting the electrode 25 along a line Da2 and thus electrically disconnecting it from the left display electrode 26. Thereafter, both display electrodes 26 are electrically connected to the conductor 31 by the same method as in the case where the short-circuiting takes place at point Xl between the left display electrode 26 and the auxiliary capacitance line 27. As a result of this, an electrical charge can be supplied from the TFT 13 to the eft display electrode 26 even though this electrode 26 is no longer electrically connected to the source electrode 25.

The inventors hereof manufactured liquid-crystal display devices of the type shown in FIGS. 4 and 5, a few pixels of which were found to be defective. The defective pixels were repaired as described above. Thereafter, the display devices were driven, displaying white-raster images, black-raster images, and moving pictures. These images and pictures were examined. It was ascertained that the luminance difference between the repaired pixels and the neighboring pixels was too small to be conceived by naked eyes and resulted in no practical problems.

Figure 6:
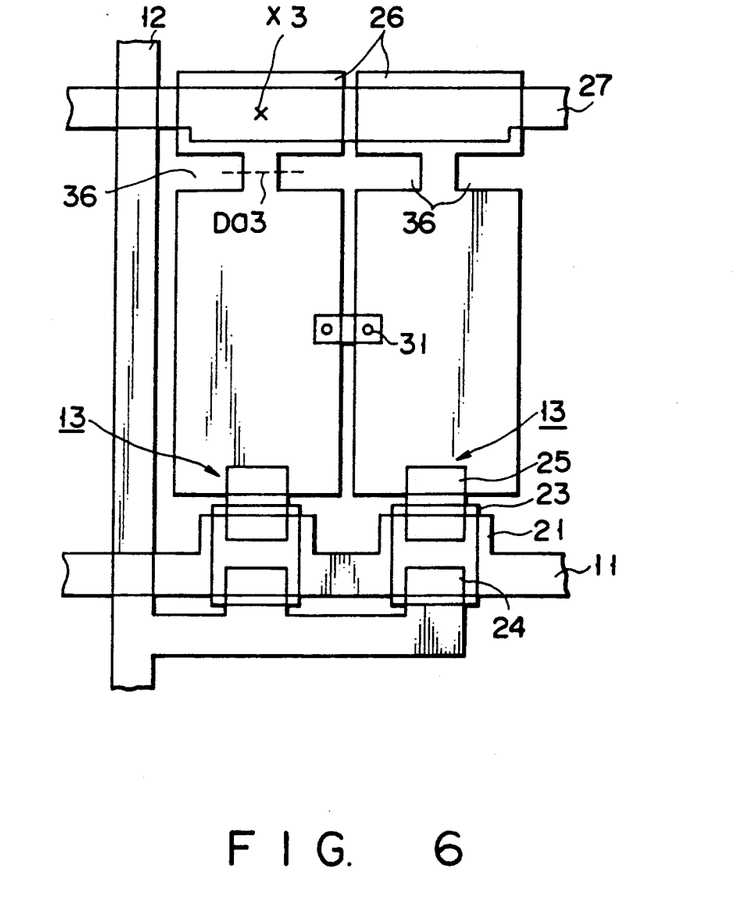
FIG. 6 is a plan view showing one of the pixels of a modification of the display device illustrated in FIGS. 4 and 5.

FIG. 6 is a plan view showing one of the pixels of a modification of the display device illustrated in FIGS. 4 and 5. The modified display device differs from the embodiment of FIGS. 4 and 5 in the shape of the two display electrodes 26 and the position of the auxiliary capacitance line 27. More specifically, the electrode 27 extend below the end-portions of the display electrodes 26, and either display electrode 26 has two notches 36 which extends parallel to the line 27 and define s waist of the electrode 26.

If short-circuiting occurs at point X3 between the left display electrode 26 and the auxiliary capacitance line 27 as is illustrated in FIG. 6, a laser beam is applied to the waist of the left display electrode 26, thus cutting the waist along the broken line Da3 (FIG. 6). Hence, the short-circuited part of the left display electrode 26 is electrically isolated from the remaining part of the electrode 26. Then, a laser beam is applied to those parts of the conductor 31 which overlap both display electrodes 26, thus forming openings in the gate-insulating film 22 and electrically connecting both electrodes 26 to the conductor 31.

In the embodiment of FIGS. 4 and 5, the auxiliary capacitance line 27 is cut at two parts, in order to repair a pixel. Therefore, it is impossible to repair two or more of the pixels connected to each auxiliary capacitance line 27 even if a current can be supplied via the electrode 27 in either direction. If a current flows through the electrode 27 in one direction only, none of the pixels connected to each auxiliary capacitance line 27 can be repaired at all. In the modified device shown in FIG. 6, two or more pixels coupled to each auxiliary capacitance line 27 can be repaired, in whichever direction a current flows through the auxiliary capacitance line 27. This is because the display electrodes 26 of any defective pixel are cut, not the auxiliary capacitance line 27, in order to repair the defective pixel. The modified device has the same advantages as the device of FIGS. 4 and 5, which result from the repairing of pixels by use of a laser.

In both the device shown in FIGS. 4 and 5 and the device illustrated in FIG. 6, each pixel has two display electrodes 26. Nonetheless, each pixel can have three or more display electrodes. The more display electrodes each pixel has, the more easy it is to determine where short-circuiting, if any, is occurring in the pixel. Further, the auxiliary capacitance line 27 can be dispensed with, if unnecessary.

Defective pixels, if any, of either liquid-crystal display device described above, which have resulted from the short-circuiting between the electrodes, can be repaired by applying a laser beam to the short-circuiting parts of the defective pixels. Once these defective pixels are thus repaired, no defective spots will appear on the display screen of the device when the device is driven. The liquid-display device of active matrix type therefore display high-quality images.

Although the liquid-crystal devices can display high-quality images which have virtually no defective spots, they have a drawback. Since the pixel-array substrate 40A has a multi-layered structure complicated in electrode-arrangement, a large coupling capacitance exists between each display electrode 26 and the adjacent electrodes. Due to this coupling capacitance, the potential of the electrode 26 varies when the potential of any adjacent electrode changes even while the TFT 13 is off. The coupling capacitance between the scanning line 11 and the source electrode 25 is particularly large 11. The coupling capacitance between the scanning line 11 and the source electrode 25 of one pixel is different from the coupling capacitance between the line 11 and the source electrode 25 of another pixel, for two reasons. First, the source electrode 25 of one pixel overlaps the scanning line 11 at an area larger or smaller than the area at which the source electrode 25 of any other pixel overlaps the scanning line 11. Secondly, the gate-insulating film 22 of one pixel has a thickness different from that of the film 22 of any other pixels. The difference among the pixel in terms of coupling capacitance inevitably leads to the difference in potential among the display electrodes 26. In order to reduce the coupling capacitance difference, the auxiliary capacitance line 27 is provided, increasing the capacitance 15 of each pixel.

In the liquid-crystal display device of FIG. 6, however, the capacitance between the gate electrode 21 and source electrode 25 of any repaired pixel remains unchanged, even though the auxiliary capacitance has been reduced. The potential of the the display electrode 26 cut along the line Da3 (FIG. 6) inevitably changes more than than that of either display electrode of any flawless pixel. Consequently, the defective spot, which the repaired pixel forms when driven, remains perceptible on the screen of the liquid-crystal display device. Certainly it is possible to disconnect one of the TFTs 13 from the display electrode 26 in order to compensate for the reduction of the auxiliary capacitance. However, to achieve a successful compensation for the capacitance reduction by this method, the two TFTs 13 must have exactly identical size. The TFTs 13 cannot be formed to have the same size because of the limited freedom of design. Neither is it possible to reduce the auxiliary capacitance to the desired value, nor to decrease the capacitance between the gate electrode 21 and the source electrode 25 to the optimal value.

Another problem arises, in the manufacture of, particularly, a liquid-crystal display device having a large screen. As has been described above, the pixel-array substrate of the display device are produced by means of micro-processing, wherein photolithography is repeated by using six to eight photoetching masks in most cases. More precisely, layers are formed on a substrate, one upon another, by repeating the step of forming a layer, the step of exposing the layer to light through a mask, and the step of etching the layer. The pattern of each layer thus formed must be aligned with the pattern of any other layer. In practice, however, one layer is inevitably displaced with respect to another. Further, an error in rotation-mode mask alignment or the deforming of the substrate, either made during the manufacture of the pixel-array substrate, results in an uneven distribution of pattern alignment over the substrate. This uneven pattern-alignment distribution causes a non-uniform distribution of the source-drain capacitance, which results in an non-uniform brightness distribution on the display screen. The larger the display screen, the more uneven the brightness distribution.

With the technique now available it is possible to pattern a layer by exposing the layer one time through a photomask, provided the layer has a size of 4×4 inches or less. At present it is demanded that liquid-crystal display devices having a larger screen be provided. In order to meet this demand, so-called division-exposure technique is performed in producing a pixel-array substrate. In the division-exposure technique, the segments of the pattern of each layer to be formed are copied on separate photomasks formed on the portions of the layer, and these portions of the layer are sequentially exposed to light through the photomasks. The exposure apparatus cannot be positioned with respect to the photomasks with the same precision. Hence, the patterned portions of the layer are aligned to those of the immediately lower layer, but with different accuracies. Consequently, the gate-source capacitance of the pixels forming one screen portion differs from that of the pixels forming another screen portion, and the screen portions have different brightness. This problem can hardly be solved in the liquid-crystal display device o FIG. 6.

The liquid-crystal display device shown in FIG. 6 is also disadvantageous in that either display electrode of each pixel has notches 36, and its optically effective area is small than otherwise. Inevitably the electrode 26 occupies a large area, as compared with the display electrode 26 shown in FIG. 4 which has the same optically effective area. Consequently, the device of FIG. 6 has a pixel-opening ratio less than that of the device shown in FIGS. 4 and 5, and can hardly have so high a pixel density as is desired at present.

In summary, the liquid-crystal display device of active matrix type illustrated in FIG. 6 has three drawbacks. First, any pixel repaired forms a defective spot conceivable on the display screen. Second, the larger the display screen, the more uneven the brightness distribution. Third, the pixel-opening ratio is less than desired since each pixel is relatively small Various liquid-crystal display devices of active matrix type according to the present invention, which solve the problems inherent in the device of FIG. 6, will now be described with reference to FIGS. 7 to 14.

Figure 7:
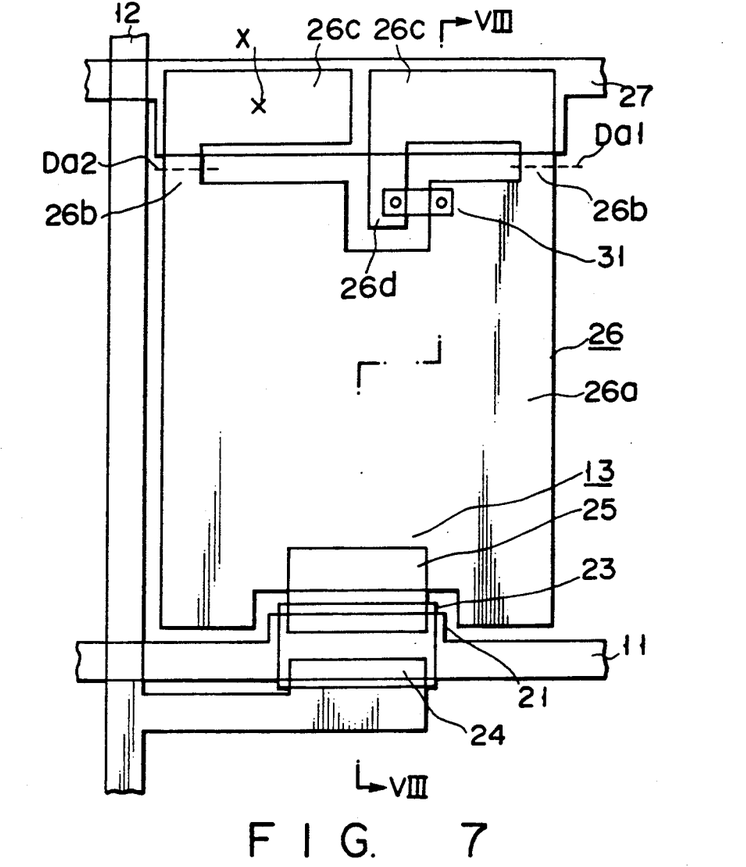
FIG. 7 is a plan view representing one of the pixels of a liquid-crystal display device of active matrix type, according to a second embodiment of the present invention.
Figure 8:
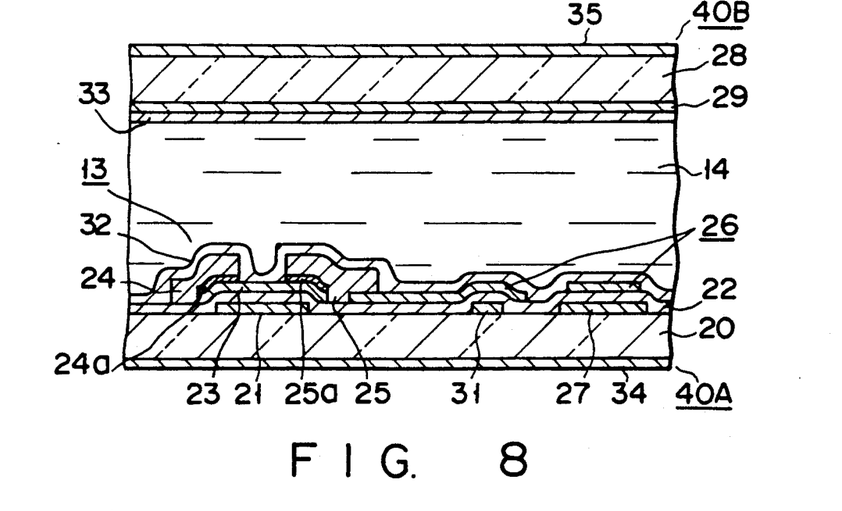
FIG. 8 is a sectional view, taken along line VIII—VIII in FIG. 7.

The display device shown in FIGS. 7 and 8 is characterized in that each pixel has one display electrode 26. The display electrode 26 consists of a main portion 26a, two thin connecting portions 26b, two auxiliary capacitance portions 26c, and a projecting portion 26d. The connecting portions connect the auxiliary capacitance portions 26c to the main portion 26a. The projecting portion 26d extends from one of the auxiliary capacitance portions 26c into a notch made in the main portion 26a. As is evident from FIG. 7, the components 26a, 26b, 26c, and 26d of the display electrode 26 are formed integrally.

As is illustrated in FIG. 7, an auxiliary capacitance line 27 extends parallel to a scanning line 11, crossing both auxiliary capacitance portions 26c. As is shown in FIG. 8, a conductor 31 is formed on a lower insulating substrate 20, located partly below the main portion 26a of the display electrode 26 and partly be low the projecting portion 26d thereof. The conductor 31 is insulated from the display electrode 26 by a gate-insulating film 22.

Let us assume that short-circuiting occurs at point X between the left auxiliary capacitance portion 26c and the auxiliary capacitance line 27, as is illustrated in FIG. 7. In this case, a laser beam is applied to the right connecting portion 26b of the display electrode 26, thus cutting this portion 26b along the broken line Da1, whereby the right auxiliary capacitance portion 26c is electrically disconnected from the main portion 26a. The pixel is still short-circuiting at this time. Hence, it is determined that the short-circuiting is occurring at the left auxiliary capacitance portion 26c. Then, a laser beam is applied the left connecting portion 26b of the display electrode 26, thus cutting this portion 26b along the broken line Da2, whereby the left auxiliary capacitance portion 26c is electrically disconnected from the main portion 26a. Next, a laser beam is applied to those parts of the conductor 31 which overlap the main portion 26a and projecting portion 26d of the display electrode 26, thus forming openings in the gate-insulating film 22. As a result of this, the conductor 31 electrically connects the main portion 26a of the electrode 26 to the right auxiliary capacitance portion 26c, which is not short-circuited with the auxiliary capacitance line 27. The pixel is, thus, repaired.

If the short-circuiting ceases to exist in the pixel at the time the right auxiliary capacitance portion 26c is cut with a laser beam along the line Da1, it is then determined that the short-circuiting is occurring at the right auxiliary capacitance portion 26c.

The device shown in FIGS. 7 and 8 is as disadvantageous as the device of FIG. 6, in that the defective spot, which the repaired pixel forms when driven, remains perceptible on the screen of the device. Nevertheless, it has a higher pixel-opening ratio than the liquid-crystal display device illustrated in FIG. 6. As is known in the art, the smaller the pixels of a liquid-crystal display, the less distinguishable the repaired pixels from the other pixels in terms of brightness. In view of this, the liquid-crystal display device shown in FIGS. 7 and 8 is particularly suitable as a direct-view type display having a high pixel-opening ratio and a high pixel density.

FIGS. 9 to 14 are plan views showing various modifications of the display device illustrated in FIGS. 7 and 8, each representing one of the pixels of the modification. These modified display devices are identical to the device shown in FIGS. 7 and 8 in respect of the pixel structure, except that two TFTs 13A and 13B are used for each display electrode 26. The TFTs 13A and 13B have their gate electrodes 21 connected to the same scanning line 11, their drain electrodes 24 coupled to the same signal line 12, and their source electrodes 25 connected to the main portion 26a of the display electrode 26. In other words, the TFTs 13A and 13B share one scanning line 11 and one signal line 12. In the liquid-crystal display device of FIG. 9, the two TFTs 13A and 13B of each pixel have the same size. If short-circuiting occurs at point X between the left auxiliary capacitance portion 26c and the auxiliary capacitance line 27, the pixel is repaired in basically the same way as in the liquid-crystal display device shown in FIGS. 7 and 8. However, the source electrode 25 of the TFT 13B with a laser beam along line Da3, thereby electrically disconnecting the TFT 13B from the display electrode 26, after the connecting portions 26b of the electrode 26 have been cut with a laser beam along lines Da1 and Da2, and after the right auxiliary capacitance portion 26c has been connected to the main portion 26a by means of the conductor 31. Once the TFT 13B is disconnected from the display electrode 26, the gate-source capacitance is reduced to match with the reduced auxiliary capacitance. Thus, the potential of the display electrode 26 changes to almost the same degree as those of the display electrodes of the normal pixels. Hence, the repaired pixel is less distinguishable from the normal pixels than in the liquid-crystal display device shown in FIGS. 7 and 8. In addition, the repaired pixel has a higher opening ratio than the pixel shown in FIG. 6, though the spot which it forms when driven, remains as conspicuous on the screen as the spot formed by the repaired pixel illustrated in FIG. 6.

Figure 10:
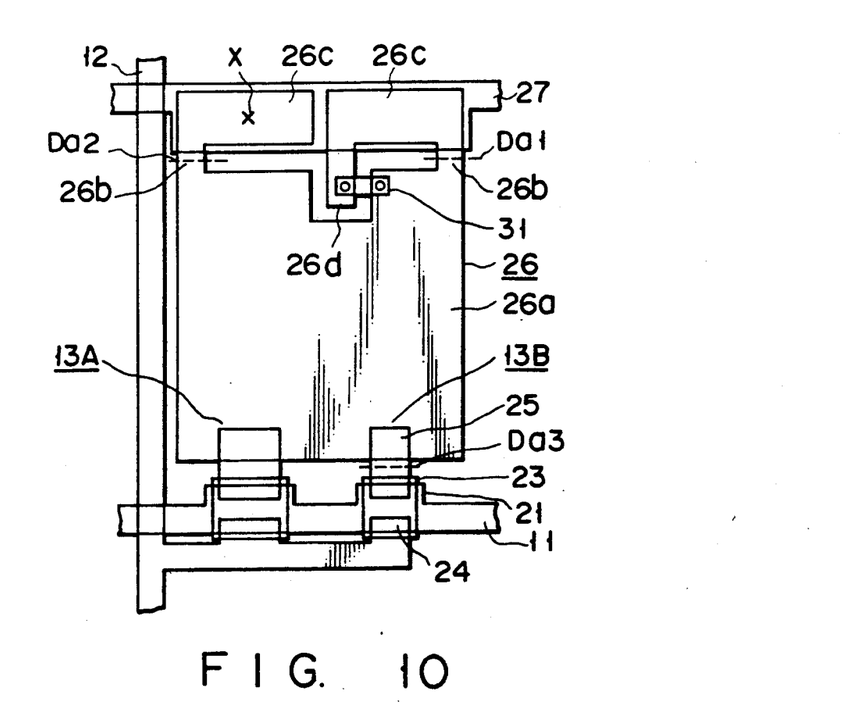

The liquid-crystal display device shown in FIG. 10 is characterized in that the two TFTs 13A and 13B have different sizes. More precisely, the TFT 13B to be disconnected from the display electrode 26 to repair the pixel is smaller than the TFT 13A, such that the gate-source capacitance is reduced to match with the reduction in the auxiliary capacitance, which occurs when the pixel is repaired. Therefore, the changes in the potential of the display electrode 26 are substantially the same as those of the display electrode of any normal pixel. As a result, the spot which the repaired pixel forms when driven cannot be distinguished at all from the spot formed by any normal pixel.

Figure 9:
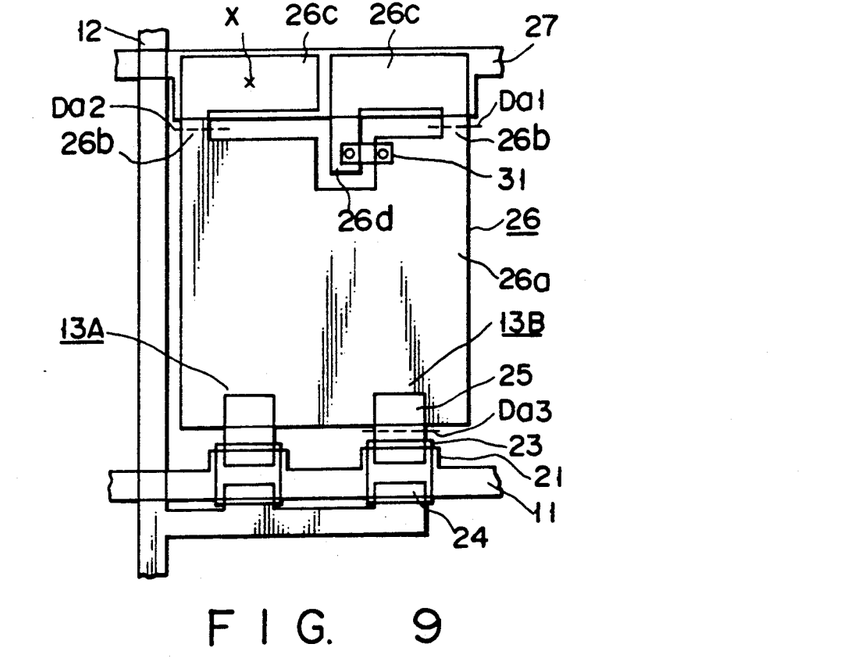
FIGS. 9 to 14 are plan views showing various modifications of the display device illustrated in FIGS. 7 and 8, each representing one of the pixels of the modification.
Figure 11:
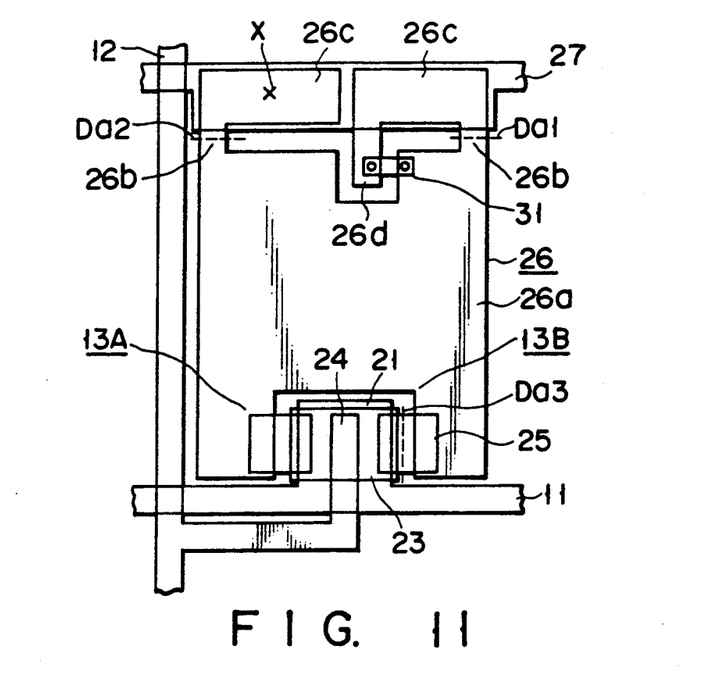
Figure 12:
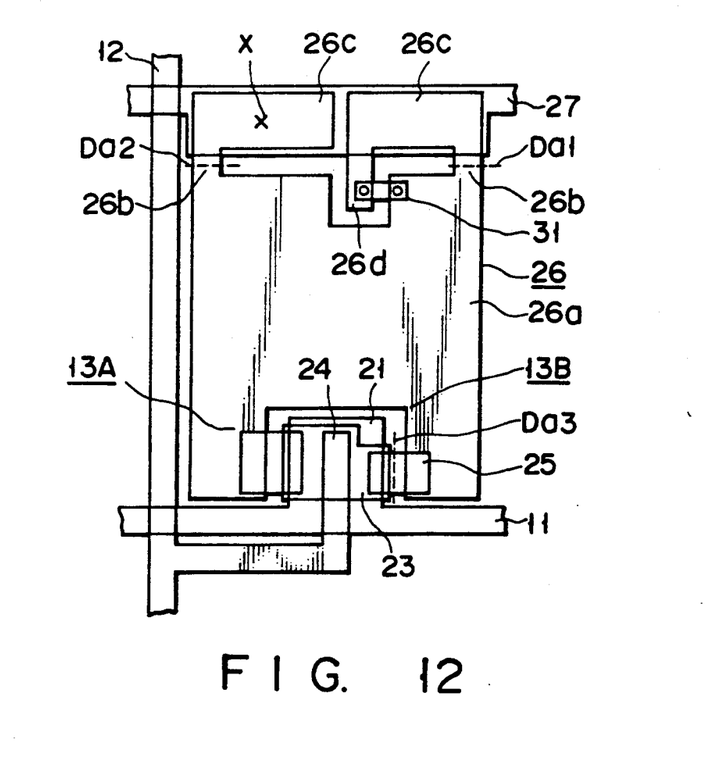

The liquid-crystal display devices shown in FIGS. 11 and 12 are different from the devices of FIGS. 9 and 10, in the structures of TFTs 13A and 3B. To be more specific, the TFTs 13A and 13B have a common gate electrode 21, a common semiconductor layer 23, and common drain electrode 24. The drain electrode 24 extends toward the main portion 26a of the display electrode 26. The TFTs 13A and 13B are arranged symmetrically with respect to the drain electrode 24.

In the device shown in FIG. 11, the TFTs 13A and B have the same size. If short-circuiting occurs at point X between the left auxiliary capacitance portion 26c and the auxiliary capacitance line 27, the pixel is repaired in the same way a in the liquid-crystal display device shown in FIG. 9. Since the TFTs 13A and 13B have the same size, the sum of the gate-source capacitances of the TFTs 13A and 13B remains unchanged, even if an error is made in the mask-aligning process. Hence, the brightens distribution on the display screen is satisfactorily uniform, though the spot, which the repaired pixel forms when driven, remains as conspicuous on the screen as the spot formed by the repaired pixel illustrated in FIG. 9.

By contrast, in the device shown in FIG. 12, the TFTs 13A and 13B have different sizes, as in the liquid-crystal display device illustrated in FIG. 10. The TFT 13B, which is to be disconnected from the display electrode 26 to repair the pixel, is smaller than the TFT 13A such that the gate-source capacitance is reduced to match with the reduction in the auxiliary capacitance, which occurs when the pixel is repaired. Since the TFTs 13A and 13B have different sizes, the gate-source capacitance of the repaired pixel is likely to differ from those of the normal pixels when errors are made in the mask-aligning process. This difference in the gate-source capacitance, however, is far less than in the liquid-crystal display devices shown in FIGS. 7 to 10. Hence, the spot, which the repaired pixel forms when driven, can hardly be distinguished from the spot formed by any normal pixel.

Figure 13:
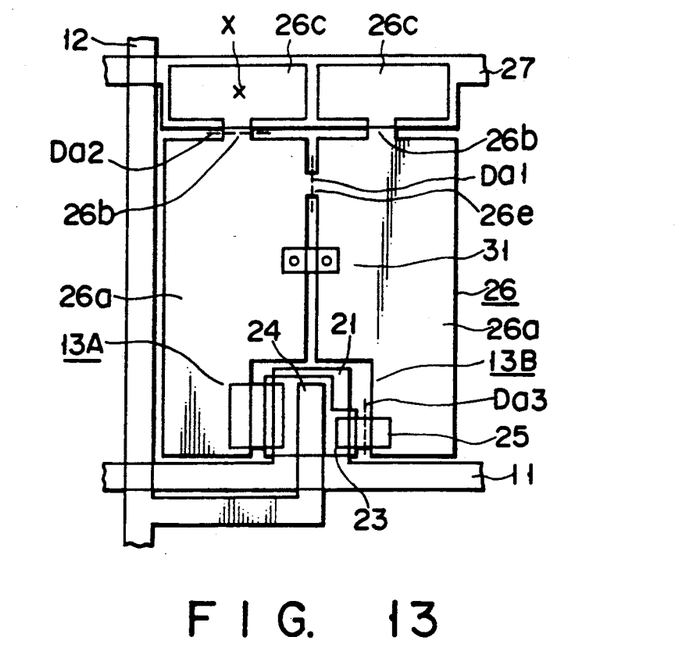

The liquid-crystal display device shown in FIG. 13 is characterized in that two coaxial, long notches are made in a display electrode 26, thus dividing the main portion 26a into halves and forming a connecting portion 26e connecting these halves. The device is also characterized in that two coaxial, rectangular notches extending parallel to the auxiliary capacitance line 27 are cut in each display electrode half, thus defining a main portion 26a, a connecting portion 26b, and an auxiliary capacitance portion 26c. A conductor is formed, which overlaps the main portions 26a of both display electrode halves. Two TFTs 13A and 13B are connected to the main portions 26a, respectively, in the same way as in the display device illustrated in FIG. 12.

Let us assume that short-circuiting occurs at point X between the left auxiliary capacitance portion 26c and the auxiliary capacitance line 27, as is shown in FIG. 13. In this case, a laser beam is applied to the connecting portion 26e connecting the main portions 26a, thus cutting this portion 26b along the broken line Da1. At this time, the right half of the pixel comes to be driven in normal way. It is determined that the short-circuiting is occurring in the left half of the pixel. Next, a laser beam is applied to the left connecting portion 26b, cutting the same along line Da2. As a result of this, the left auxiliary capacitance portion 26c, which is short-circuited to the auxiliary capacitance line 17, is electrically disconnected from the main portion 26a of the left display electrode half. Further, a laser beam is applied to those parts of the conductor 31 which overlap the main portions 26a of the display electrode halves, whereby the conductor 31 electrically connects the main portions 26a.

With the embodiment of FIG. 13 it is possible to determine, by visual examination, in which pixel half the short-circuiting is occurring, after the connecting portion 26e has been cut along the line Da1. It is also possible to lessen the short-circuiting between the gate electrode 21 and source electrode 25 of either TFT. More specifically, if the left pixel half is still short-circuited after the left connecting portion 26b auxiliary capacitance portion 26c from the left main portion 26a, it is then determined the short-circuiting is occurring in the TFT 13B. In this case, it suffices to cut the source eectrode 25 of the TFT 13B, thereby disconnecting the TFT 13B from the display electrode 26.

Figure 14:
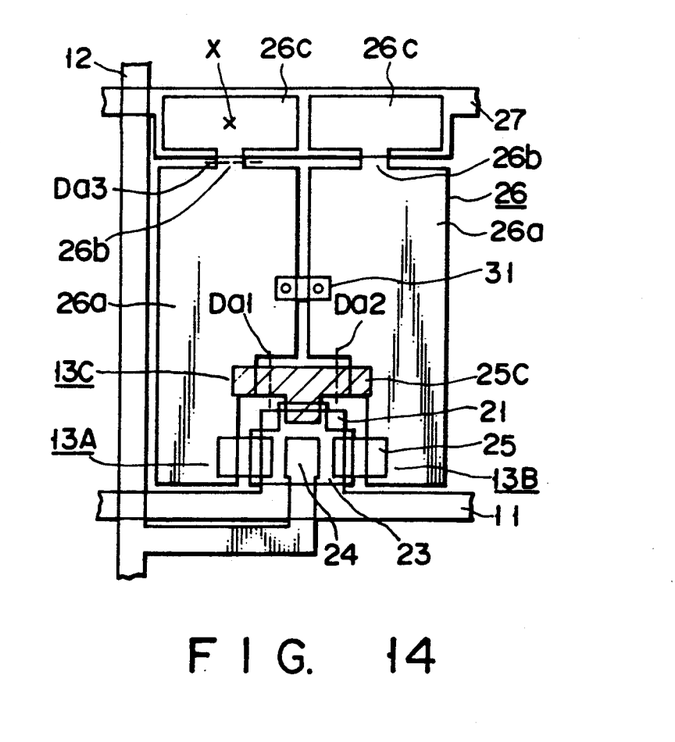

The liquid-crystal display device illustrated in FIG. 14 is different from the device of FIG. 13 in three respects. First, the display electrode 26 of each pixel is divided into two halves 26 which are completely separated from each other; there is provided no element corresponding to the connecting portion 26e shown in FIG. 13. Second, the TFTs 13A and 13B have the same size. Third, each pixel has a third TFT 13C, in addition to the TFTs 13A and 13B. The TFT 13C shares the gate electrode 21, the semiconductor layer 23, and the drain electrode 24 with the TFTs 13A and 13B. The TFT 13C has a source electrode 25c which electrically connects the main portions 26a of the display electrode halves 26.

In the embodiment of FIG. 14, the TFTs 13A and 13B are arranged symmetrically with respect to the common drain electrode 24, as in the embodiment illustrated in FIG. 11. Hence, the spot, which the pixel forms when driven, can hardly be distinguished from the spot formed by any other pixel even if errors are made in the mask-aligning process. Let us assume that short-circuiting occurs at point X between the left auxiliary capacitance portion 26c and the auxiliary capacitance line 27, as is shown in FIG. 14. In this case, a laser beam is applied to the source electrode 25c of the third TFT 13C, cutting the electrode 25c at two parts, along lines Da1 and Da2. As a result of this, the main portions 26a of the display electrode halves 26 are electrically disconnected from each other. At the same time, the third TFT 13C is disconnected from both display electrode halves 16. Thereafter the left connecting portion 26b is cut with a laser beam along line Da3, as in the device of FIG. 7. The left auxiliary capacitance portion 26c, which is short-circuited to the auxiliary capacitance line 17, is thereby electrically disconnected from the main portion 26a of the left display electrode half 26. Further, a laser beam is applied to those parts of the conductor 31 which overlap the main portions 26a of the display electrode halves 26, whereby the conductor 31 electrically connects the main portions 26a. Even after the pixel has thus been repaired, the TFTs 13A and 13B remain positioned symmetrically, unlike in the display device illustrated in FIG. 13. Hence, the display-electrode potential of the repaired pixel does not differ from the normal pixels so much as in the liquid-crystal device illustrated in FIG. 13.

Figure 15:
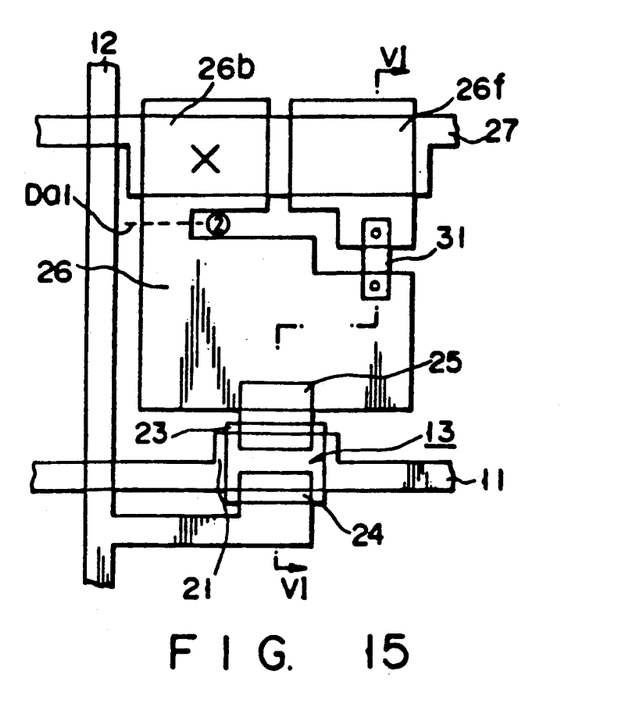
FIG. 15 is a plan view illustrating one of the pixels of a liquid-crystal display device of active matrix type, according to a third embodiment of the invention.
Figure 16:
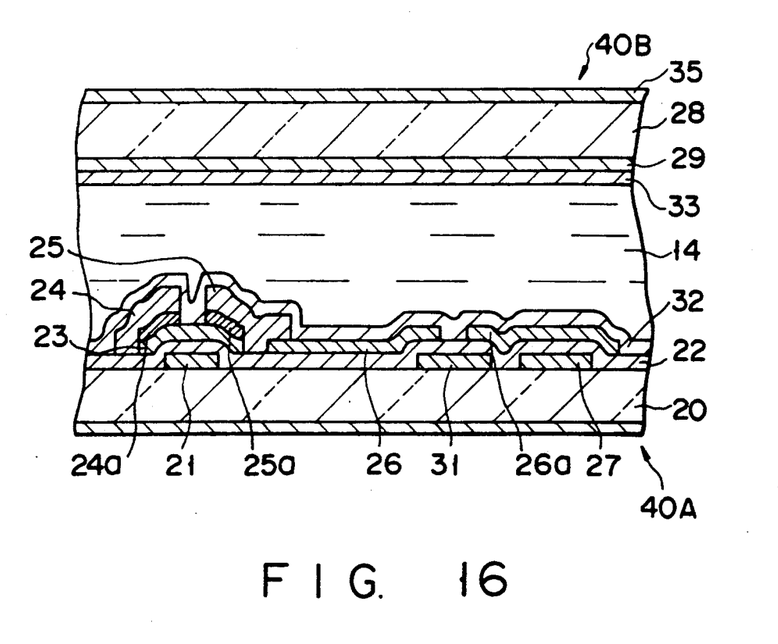
FIG. 16 is a sectional view, taken along line VI—VI in FIG. 15.

Another liquid-crystal display device of active matrix type, according to the present invention will now be described, with reference to FIGS. 15 and 16. FIG. 15 is a plan view illustrating one of the pixels of this device, and FIG. 16 is a a sectional view, taken along line VI—VI in FIG. 15.

As is illustrated in FIG. 15, the pixel has one TFT 13, a display electrode 26, two auxiliary capacitance electrodes 26f and 26b, and a conductor 31. The first auxiliary capacitance electrode 26b is integrally formed with the display electrode 26, whereas the second auxiliary capacitance electrode 26f is electrically disconnected from the display electrode 26. The conductor 31 overlaps the display electrode 26 and the second auxiliary capacitance electrode 26f and is electrically floating therefrom. The TFT 13 comprises a gate electrode 21, a gate-insulting film 22, a semiconductor layer 23, a drain electrode 24, and a source electrode 25. The gate electrode 21 is integrally formed with a column-selecting line 11, and the drain electrode 24 is integrally formed with a column-selecting line 12. An auxiliary capacitance line 27 extends substantially parallel to the row-selecting line 11, crossing both auxiliary capacitance electrodes 26f and 26b.

Let us assume that short-circuiting occurs at point X between the first auxiliary capacitance electrode 26b and the auxiliary capacitance line 27, as is shown in FIG. 15. In this case, the first auxiliary capacitance electrode 26b is cut with a laser beam from the display electrode 26. At this time, the pixel does not become defective, but its display-electrode potential becomes lower than those of the adjacent pixels. Hence, the spot, which the pixel forms when driven, is inevitably less bright than the spots formed by the adjacent pixels. In order to make this spot equally bright, a laser beam is applied to those parts of the conductor 1 which are electrically floating from the display electrode 26 and the second auxiliary capacitance electrode 26f. Therefore, the conductor 31 electrically connects the display electrode 26 coupled to the source electrode 25 to the second auxiliary capacitance electrode 26f. As a result of this, the first and second auxiliary capacitance electrodes 26b and 26f have the same capacitance, and there is no difference in display-electrode potential between the repaired pixel and any normal pixel. Hence, the spot, which the repaired pixel forms when driven, can hardly distinguished from the spots formed by the normal pixels.

As has been described above, the present invention can provide a liquid-crystal display device of active matrix type with which it is possible to repair defective pixels, if any, almost completely by means of a laser, while maintaining the pixel-opening ratio at a large value.

According to the invention, a defective pixel is repaired by cutting a part or parts of the display electrode of the pixel, by electrically connecting the components of the pixel by a conductor, and by electrically disconnecting a switching element from the display electrode, thereby reducing the capacitance of the switching element, making the same match with the decrease of the auxiliary capacitance of the pixel. Hence, the changes in the display-electrode potential of the repaired pixel are similar to the changes in the display-electrode potential of the normal pixels. Since the parts of the display electrode of any pixel are electrically connected to one another, the design freedom for the pixel is great. Therefore, the switching element can be designed to have any desired characteristics and arranged at a desired position, and the display electrode can be divided into parts in various ways. Further, in the liquid-crystal display device, the spot, which any repaired pixel forms when driven, can hardly be distinguished from the spot formed by any normal pixel even if errors have been made in the mask-aligning for any exposure process during the manufacture of the device. Hence, the device has virtually no defective pixels and can, therefore, display high-quality images.

What is claimed is:

1. A liquid-crystal display device of active matrix type comprising:
    a transparent substrate;
    a plurality of column-selecting lines arranged on said substrate;
    a plurality of auxiliary capacitance lines arranged on said substrate substantially parallel to and electrically insulated from said column-selecting lines;
    a plurality of row-selecting lines arranged on said substrate, intersecting with said column-selecting and auxiliary capacitance ilnes, and electrically insulated from said column-selecting and auxiliary capacitance lines;
    a plurality of display electrodes arranged in rows and columns, each defining one pixel and consisting of a first display-electrode segment and a second display-electrode segment;
    a plurality of first switching elements connecting said first display-electrode segments to said column-selecting lines and said row-selecting lines;
    a plurality of second switching elements connecting said second display-electrodes segments to said column-selecting lines and said row-selecting lines;
    a first auxiliary capacitor interposed between said first display-electrode segments and said auxiliary capacitance lines;
    a second auxiliary capacitor interposed between said second display-electrode segments and said auxiliary capacitance lines;
    a plurality of conductors each corresponding to a pixel, each conductor overlapping a corresponding first display-electrode segment and a corresponding second display-electrode segment, each conductor for electrically connecting said corresponding first and second display-electrode segments;
    a common electrode opposing said first and second display-electrode segments;
    a layer of liquid crystal interposed between said common electrode and said first and second display-electrode segments.

2. The display device according to claim 1, further comprising an insulating film formed on said transparent substrate covering said auxiliary capacitance lines and said conductors.

3. The display device according to claim 2, wherein each of said first and second switching elements includes:
    a gate electrode formed on said transparent substrate and connected to a corresponding column-selecting line, said insulating film covering said gate electrodes,
    a semiconductor layer having a source region and drain region formed on said insulating film above each gate electrode,
    a source electrode formed on said source region of said semiconductor layer and connected to a corresponding first display-electrode segment and a corresponding second display-electrode segment, and a drain electrode formed on said drain region of said semiconductor layer and connected to the corresponding row-selecting line.

4. The display device according to claim 1, wherein each of said first and second switching elements has a transistor structure.

5. The display device according to claim 1, wherein each of said first and second display-electrode segments has a main portion defining a pixel, a capacitive portion opposing the corresponding auxiliary capacitance line forming said first and second auxiliary capacitors, and a thin portion connecting the capacitive portion to the main portion which is easy to cut.

6. A liquid-crystal display device of active matrix type comprising:

a transparent substrate;

a plurality of column-selecting lines arranged on said transparent substrate;

a plurality of auxiliary capacitance lines arranged on said substrate substantially parallel to and electrically insulated from said column-selecting lines;

a plurality of row-selecting lines arranged on said transparent substrate, intersecting with said column-selecting and auxiliary capacitance lines, and electrically insulated form said column-selecting and auxiliary capacitance lines;

a plurality of display electrodes arranged in rows and columns, each defining one pixel;

a plurality of first display-electrode segments projecting from said display electrodes, respectively;

a plurality of second display-electrode segments projecting from said display electrodes, respectively;

a plurality of switching elements connecting said display electrodes to said column-selecting ilnes and said row-selecting lines, respectively;

a first auxiliary capacitor interposed between said first display-electrode segments and said auxiliary capacitance lines;

a second auxiliary capacitors interposed between said second display-electrode segments and said auxiliary capacitance lines;

a plurlaity of conductors each corresponding to a pixel, each conductor overlapping a corresponding first display-electrode segment and a corresponding display electrode, each conductor for electrically connecting said corresponding first display-electrode segment and said corresponding display electrode;

a common electrode opposing said first display-electrode segments, said second display-electrode segments, and said display electrodes; and a layer of liquid crystal interposed between said common electrode and said first and second display-electrode segments.

7. The display device according to claim 6, further comprising an insulating film formed on said transparent substrate covering said auxiliary capacitance lines and said conductors.

8. The display device according to claim 6, wherein each of said switching elements has a transistor structure.

9. The display device according to claim 8, wherein each of said switching elements includes:

a gate electrode formed on said transparent substrate and connected to a corresponding column-selecting line, said insulating film covering said gate electrodes, a semiconductor layer having a source region and drain region formed on said insulating film above each gate electrode, a source electrode formed on said source region of said semi-conductor layer and connected to a corresponding first display-electrode segment and a corresponding second display-electrode segment, and a drain electrode formed on said drain region of said semiconductor layer and connected to the corresponding row-selecting line.

10. The display device according to claim 6, further comprising a plurality of second switching elements connected to said column-selecting and row-selecting lines which correspond to said display electrodes.

11. The display device according to claim 10, wherein one of said first switching elements and said second switching elements are electrically isulated from said display electrodes.

12. The display device according to claim 10, wherein said first switching elements have a capacitance different from that of said second switching elements.

13. The display device according to claim 6, wherein each of said first and second display-electrode segments has a capacitive portion opposing a corresponding auxiliary capacitance line, and a thin portion connecting the capacitive portion to the corresponding display electrode which is easy to cut.

14. The display device according to claim 6, wherein each of said display electrodes comprises two segments and a thing portion connecting these segments and being easy to cut.

15. A liquid-crystal display device of active matrix type which comprises:

a transparent substrate;

a plurality of column-selecting lines arranged on said transparent substrate;

a plurality of auxiliary capacitance lines arranged on said transparent substrate and electrically insulated from said column-selecting lines;

a plurality of row-selecting lines arranged on said transaprent substrate, intersecting with said column-selecting and auxiliary capacitance ilnes, and electrically insulated from said column-selecting and auxiliary capacitance lines;

a plurality of display electrodes arranged in rows and columns, each defining one pixel;

a plurality of first display-electrode segments projecting from said display electrodes, respectively;

a plurality of second display-electrode segments electrically insulated from said display electrodes, respectively;

a plurality of switching elements connectign said display electrodes to said column-selecting lines and said row-selecting lines, respectively;

a first auxiliary capacitor interposed between said first display-electrode segments and said auxiliary capacitance lines;

a second auxiliary capacitors interposed between said second display-electrode segments and said auxiliary capacitance lines;

a plurality of conductors each corresponding to a pixel, each conductor overlapping a corresponding display electrode and a corresponding second display-electrode segment, for electrically connecting said display electrode and said second display-electrode segment;

a common electrode opposing said first display-electrode segments and said second display-electrode segments; and a layer of liquid crystal interposed between said common electrode and said first and second display-electrode segments.

16. The display device according to claim 15, further comprising an insulating film formed on said transaprent substrate covering said auxiliary capacitance lines and said conductors.

17. The display device according to claim 16, wherein each of said switching elements includes:

a gate electrode formed on said transaprent substrate and connected to a corresponding column-selecting line, said insulating film covering said gate electrodes, a semiconductor layer having a source region and a drain region formed on said insulating film above each gate electrode, a source electrode formed on said source region of said semiconductor layer and connected to one of a corresponding first display-electrode segment and a corresponding second display-electrode segment, and a drain electrode formed on said drain region of said semiconductor layer and connected to a corresponding row-selecting line.

18. The display device according to caim 15, wherein each of said switching elements has a transistor structure.

19. The display device according to claim 18, wherein at least one auxiliary capacitance line is electrically connected to a first display-electrode segment, and a corresponding conductor is electrically connected to a corresponding second display-electrode segment and a corresponding display electrode.

20. The display device according to claim 18, wherein at least one auxiliary capacitance line is electrically connected to a second display-electrode segment, and a corresponding conductor is electrically insulated from a corresponding first display-electrode segment and a corresponding display electrode.

21. The display device according to claim 15, wherien each of said first display-electrode segments has a capacitive portion opposign a corresponding auxiliary capacitance line, and a thin portion connecting the capacitive portion to a corresponding display electrode which is easy to cut.

* * * * *